(12) United States Patent
Jaffel (10) Patent No.: US 9,434,655 B2
(45) Date of Patent: Sep. 6, 2016

(54) METHOD AND APPARATUS FOR MANUFACTURING GYPSUM PRODUCTS

(75) Inventor: Hamouda Jaffel, Aulnay-sous-Bois (FR)

(73) Assignee: Saint-Gobain Placo SAS (FR)

( * ) Notice: Subject to any disclaimer, the term of this patent is extended or adjusted under 35 U.S.C. 154(b) by 134 days.

(21) Appl. No.: 14/110,344

(22) PCT Filed: Apr. 5, 2012

(86) PCT No.: PCT/EP2012/056273
§ 371 (c)(1),
(2), (4) Date: Oct. 7, 2013

(87) PCT Pub. No.: WO2012/136760
PCT Pub. Date: Oct. 11, 2012

(65) Prior Publication Data
US 2014/0026786 A1 Jan. 30, 2014

(30) Foreign Application Priority Data
Apr. 8, 2011 (EP) .................................... 11161718

(51) Int. Cl.
*C04B 38/10* (2006.01)
*B28C 5/38* (2006.01)
*C04B 28/14* (2006.01)

(52) U.S. Cl.
CPC ............. *C04B 38/106* (2013.01); *B28C 5/383* (2013.01); *B28C 5/388* (2013.01); *C04B 28/14* (2013.01); *C04B 38/10* (2013.01)

(58) Field of Classification Search
CPC ................................................... C04B 38/106

USPC .......................................... 261/128; 106/680
See application file for complete search history.

(56) References Cited

U.S. PATENT DOCUMENTS

| 2,985,219 | A |   | 5/1961 | Summerfield |
|---|---|---|---|---|
| 4,057,443 | A |   | 11/1977 | Stiling et al. |
| 4,455,271 | A |   | 6/1984 | Johnson |
| 5,085,929 | A |   | 2/1992 | Bruce et al. |
| 5,484,200 | A |   | 1/1996 | Bradshaw |
| 5,643,510 | A | * | 7/1997 | Sucech ......................... 264/40.1 |
| 5,683,635 | A |   | 11/1997 | Sucech et al. |
| 2003/0010419 | A1 | * | 1/2003 | Sethuraman ................... 156/39 |
| 2004/0083928 | A1 |   | 5/2004 | Shoshany |

(Continued)

FOREIGN PATENT DOCUMENTS

| CH | 134547 A | 8/1929 |
|---|---|---|
| EP | 0458843 B1 | 8/1996 |

(Continued)

OTHER PUBLICATIONS

Jaffel, et al, Probing Microstructure Evolution during the Hardening of Gypsum by Proton NMR Relaxometry, J. Phys. Chem. B 2006, vol. 110, No. 14, pp. 7385-7391.

(Continued)

*Primary Examiner* — Duane Smith
*Assistant Examiner* — Adam W Bergfelder
(74) *Attorney, Agent, or Firm* — GrayRobinson, P.A.; Michael J. Colitz, III (57) ABSTRACT

A method and system for producing a gypsum product comprising a mixer for mixing gypsum and water and two foam feeds into the system wherein the foam feeds each comprise foam of different bubble size distributions.

7 Claims, 7 Drawing Sheets

(56) References Cited

U.S. PATENT DOCUMENTS

| | | |
|---|---|---|
| 2004/0201120 A1 | 10/2004 | Colbert |
| 2005/0106375 A1 | 5/2005 | Kimura et al. |
| 2005/0248049 A1 | 11/2005 | Gannaway et al. |
| 2006/0045975 A1 | 3/2006 | Yamaji et al. |
| 2006/0162839 A1 | 7/2006 | Seki et al. |
| 2006/0278128 A1 | 12/2006 | Liu et al. |
| 2006/0278129 A1 | 12/2006 | Liu et al. |
| 2008/0000392 A1 | 1/2008 | Blackburn et al. |
| 2008/0223258 A1 | 9/2008 | Bruce et al. |
| 2008/0274226 A1 | 11/2008 | Gannaway et al. |
| 2009/0123727 A1 | 5/2009 | Martin et al. |
| 2009/0169864 A1 | 7/2009 | Wang et al. |
| 2010/0272983 A1 | 10/2010 | Thouilleux et al. |

FOREIGN PATENT DOCUMENTS

| | | |
|---|---|---|
| EP | 1488920 A1 | 12/2004 |
| EP | 1555099 A1 | 7/2005 |
| GB | 298847 A | 10/1928 |
| GB | 300842 A | 11/1928 |
| GB | 300843 A | 11/1928 |
| JP | H0214889 A | 1/1990 |
| JP | H0825342 A | 1/1996 |
| JP | 2001300933 A | 10/2001 |
| WO | 9723337 A1 | 7/1997 |
| WO | 0212141 A1 | 2/2002 |
| WO | 03000620 A | 1/2003 |
| WO | 2004041748 A1 | 5/2004 |
| WO | 2005080294 A | 9/2005 |

OTHER PUBLICATIONS

Song, et al, Magnetic resonance studies of hydration kinetics and microstructural evolution in plaster pastes, J. Mater Science (2009) vol. 44, No. 18, pp. 5004-5012.

Lafarge, www.lafarge.com/10082007-group-innovation_bubbles-uk_1.wmv [online]. LaFarge, 2008. Unable to retrieve from the Internet.

KNAUF GIPS KG, Notice of Opposition, dated Jul. 8, 2015, Against European Patent No. 2508316 (European Application No. 11161718.9 filed Apr. 8, 2011) for a Method for Manufacturing Gypsum Products, Patentee: Saint-Gobain Placo SAS, 34 Avenue Franklin Roosevelt, 92150, Suresnes, France.

\* cited by examiner

METHOD AND APPARATUS FOR MANUFACTURING GYPSUM PRODUCTS

CLAIM OF PRIORITY

This application is a continuation of and claims priority under 35 U.S.C. §371 to International Application No. PCT/EP2012/056273 filed on Apr. 5, 2012, which in turn claims priority to EP 11161718.9 filed on Apr. 8, 2011. The contents of both these applications are incorporated herein by reference for all purposes.

The present invention concerns a manufacturing process and associated apparatus for producing gypsum plaster products for construction purposes, for example in the manufacture of plaster board or the like.

Gypsum is a naturally occurring form of calcium sulphate, in the form of a stable dihydrate ($CaSO_4.2H_2O$). The term "gypsum", as used herein, means calcium sulphate in that stable dihydrate state, and includes the naturally occurring mineral, the synthetically derived equivalents, and the dihydrate material formed by the hydration of stucco (calcium sulphate hemihydrate) or anhydrite.

The properties of gypsum make it highly suitable for use in industrial and building plasters and other building products such as gypsum wallboard. It is a plentiful and generally inexpensive raw material which, through successive steps of dehydration and rehydration, can be cast, moulded or otherwise formed to useful shapes. For example, gypsum wallboard; also known as plasterboard or drywall, is formed as a set gypsum core sandwiched between paper cover sheets.

Gypsum is generally prepared for use as plaster by grinding and calcining at relatively low temperature (such as from about 120 to 170° C.), generally at atmospheric pressure. This results in partially dehydrated gypsum, typically in the form of the beta crystalline form of the hemihydrate, which generally has an irregular crystal structure. The beta hemihydrate may be used as a building or construction material by mixing it with water to form an aqueous stucco slurry, paste or dispersion, and then allowing the slurry to set by re-crystallisation from the aqueous medium.

It is known to use foam in the manufacture of such gypsum products. The bubbles generated by foam help to reduce the weight of the gypsum product so that shipping and handling of the product is more cost efficient. The size and distribution of the bubbles have an influence on the mechanical properties of the core of the plasterboard produced.

The foam is usually produced by utilising a quantity of foam-generating surfactant diluted with water and then combined with compressed air. This foam is then injected into the mixer which is usually a high shear mixer.

A typical foam generator comprises a tube filled with a permeable porous medium, such as packed beads of fritted glass or ceramic, with controlled pore space. The foam is then produced by injecting a blend of foaming agent and air flows into the tube. In this case, the structure of the produced foam is then controlled by optimising the applied back pressure onto the tube. Such foam generators are known as static foam generators. A typical static foam generator is described in U.S. Pat. No. 4,455,271, which is hereby incorporated by reference.

Other foam generators comprise internal rotating mechanisms to mix the water and the foaming agent thoroughly to produce foam. In some cases, the rotating blade may be equipped with mixing chambers allowing the nucleation of foam bubbles. These are known generally as dynamic foam generators. A typical dynamic foam generator is described in U.S. Pat. No. 4,057,443, which is hereby incorporated by reference.

However the arrangement and use of foam generators within a gypsum product manufacturing line provide little control of the foam structure and size of bubbles which eventually form part of the gypsum product structure, e.g. plasterboard structure.

WO2005/080294 discloses the idea of producing a gypsum slurry with controlled bubble size and distribution of the added foam. It suggests that a bi-modal distribution might be created by separating the discharge from the mixer in two different air blenders. Then these separate streams of slurry could be recombined into one slurry mixture before being deposited onto the production line conveyor. WO2005/080294 is directed to the idea of using a gypsum slurry as the liquid to create a foamed slurry. It suggests that the foam is provided without the addition of water which necessarily comes with prefabricated foam. However again it is difficult to control the size and distribution of the foam bubbles within the slurry and hence the distribution and size of the air pockets produced within the set plasterboard.

U.S. Pat. No. 5,484,200, which is hereby incorporated by reference, discloses the use of a first mixer and a second mixer operating a relatively low shear conditions compared to the first mixer. The foam is introduced into the second mixer which reduces uneven distribution of air and hence voids in the finished board product.

According to the present invention there is provided apparatus for producing gypsum products comprising a mixing unit for mixing gypsum with water and at least two foam generators each producing different foam and both arranged to provide simultaneous separate foam feeds into the mixing unit.

By providing foam from two different foam generators for mixing with gypsum and water in the mixing unit, it may be possible to change certain characteristics of the foams independently, so as to achieve an improved combination of properties in the gypsum/water/foam slurry. Preferably, the apparatus is configured to allow the physical parameters of the foam generation process (e.g. temperature, air flow, and other parameters that are unrelated to the chemical composition of the foam) to be controlled independently for each of the at least two foam generators. In addition, the apparatus may also be configured to allow for independent control of certain chemical parameters of the foam generation process (e.g. surfactant type and quantity).

Control of the physical parameters of the foam generation process is preferred to control of the chemical parameters of the foam generation process, because control of the physical parameters does not require the formulation of the foam to be changed (e.g. through the use of additional additives or changes in the relative quantities of the different chemical constituents of the foam). In addition, by controlling the physical parameters in preference to the chemical parameters of the foam generation process, it may be possible to reduce the influence of material variability (e.g. impurities) on the foam bubble size.

Preferably two foam generators are provided each being arranged to produce foam having a different air volume fraction. This may be achieved e.g. by modifying the air inflow rate into one or both foam generators, or by running the foam generators at different operating temperatures.

For example, a first one of the two foam generators may be adapted to produce foam having a density between 100 g/l and 300 g/l, preferably between 200 g/l and 300 g/l. Such foam is typically known as high density foam, or wet foam.

Such foam is considered to be relatively stable, meaning that the size and size distribution of the air bubbles within the foam does not change or evolve significantly after the foam has been generated.

A second one of the foam generators may be adapted to produce foam having a density between 20 g/l and 100 g/l, preferably between 30 g/l and 50 g/l. Such foam is typically known as low density foam, or dry foam. Such foam is considered to be relatively unstable, with the result that bubbles initially formed within the foam readily coalesce so that large bubble sizes are typically achieved. Because of its low stability, such foam has, up till now, been considered unsuitable for mixing into a gypsum slurry, particularly during production on an industrial, rather than experimental scale. In addition, it has been found that when the foam introduced into the gypsum slurry consists entirely of low density, unstable foam, it is difficult to achieve a homogeneous light weight gypsum product.

By providing foams of different density to the mixing unit, it may be possible to achieve improved control of the porous structure of the resultant gypsum product. For example, the mixture of low density and high density foam may allow large pores to be introduced into the final gypsum product, while reducing the disadvantages associated with mixing only low density, unstable foam into the gypsum slurry. Effectively, the use of two different foams allows the stability of high density foam to be combined with the high air content of low density foam, so as to provide a foam that may be readily mixed with the gypsum slurry, while introducing a high level of porosity into the resultant gypsum product.

Furthermore, the use of foams having differing air contents and densities may provide an improved bubble size distribution within the gypsum product (e.g. plasterboard). In particular, it is thought that a mixture of small bubbles (generated in the high density foam) and large bubbles (generated in the low density foam) may result in a pore structure in the gypsum product in which smaller pores fill the gaps between larger pores, thus possibly allowing the total porosity of the gypsum product to be increased.

In fact, it is considered that the improvement of the porous network achieved through the use of high density and low density foams may result in improved mechanical performance of the resultant gypsum product, for a given density of the gypsum product.

Typically, high density foam and low density foam are added to the gypsum slurry mix in the ratio 1 part high density foam to 9 parts low density foam, preferably 2 parts high density foam to 8 parts low density foam, more preferably 3 parts high density foam to 7 parts low density foam.

The two foam generators may each be static foam generators. Alternatively, the two foam generators may each be dynamic foam generators. As a further alternative, one of the two foam generators may be a static foam generator and the other foam generator may be a dynamic foam generator.

In the case that one or both of the two foam generators is a dynamic foam generator, modification of the size of the air bubbles within the foam may be achieved by changing the rotational speed of the blade. Typically, the rotational speed of the blade is maintained between 1500 rpm and 3000 rpm. The higher the rotational speed, the smaller the foam bubble size.

In the case that one or both of the two foam generators is a static foam generator, modification of the size of the air bubbles within the foam may be achieved by changing the pore size and/or pore size distribution within the permeable porous medium, i.e. by altering the parameters of the pore space network within e.g. the fritted glass or ceramic providing the permeable porous medium.

In the case that both foam generators are dynamic foam generators, the two foam generators may be configured to operate at different rotational speeds.

The used surfactant is typically a standard anionic foaming agent used in plasterboard production plants, such as sodium alkyl ether sulphate or ammonium alkyl ether sulphate having a carbon chain length between 8 to 12C.

The use of two or more foam generators may allow bubble size distribution within a gypsum product to be controlled without the need to change the composition of the foam-generating surfactant. That is, the structure of the foams injected into the mixer for forming the gypsum product may be controlled substantially or entirely through the modification of physical parameters of the foam generation process.

However, in certain cases, a first one of the two foam generators may be arranged to utilise a first surfactant and a second one of the two foam generators may be arranged to use a second surfactant having a different composition to the first surfactant.

Also, a first one of the two foam generators may utilise a foaming solution having a higher concentration of surfactant than the foaming solution that is utilised by the second one of the two foam generators. For example, the first one of the two foam generators may be configured to use a surfactant concentration of 0.01 g to 0.1 g per 100 g stucco, while the second one of the two foam generators may be configured to use a surfactant concentration of 0.005 g to 0.01 g per 100 g stucco.

Preferably the mixing unit comprises a first mixer and a second mixer, the second mixer being positioned downstream of the first mixer, so as to receive gypsum slurry produced in the first mixer. Typically, the first mixer is arranged to receive foam from a first one of the two foam generators, while the second mixer is arranged to receive foam from a second one of the two foam generators, the second one of the two foam generators being arrange to produce foam having a different density to the foam produced by the first one of the two foam generators.

Typically, in the case that two mixers are provided, the first, upstream mixer is arranged to operate at a higher shear than the second, downstream mixer. Typically, in this case, the foam provided to the upstream mixture has a higher density than the foam provided to the downstream mixer. By supplying low density unstable foam only to the downstream mixer, which operates at a lower shear rate than the upstream mixer, it may be possible to reduce damage to the structure of the unstable low density foam, so that the large bubbles of the low density foam are retained within the gypsum slurry, resulting in large pores in the final gypsum product.

Alternatively, the foam produced by each of the two foam generators may be supplied directly to the second, downstream mixer, without passing through the first, upstream mixer. Again, in this case, it may be possible to reduce damage to the low density unstable foam, so as to increase the probability that large bubbles within the low density foam are retained.

Also according to the present invention there is provided a method of producing a gypsum product wherein calcined gypsum is mixed with water within a mixing unit and at least two different foam feeds are introduced into the mixing unit simultaneously, the first foam feed comprising a different air volume fraction when compared to the second foam feed.

Preferably the method of producing a gypsum product comprises claimed gypsum being mixed with water in two mixers, the two mixers providing the claimed mixing unit, each mixer being provided with a foam feed simultaneously, the foam feeds comprising foam of different bubble size distribution.

Certain features of the present invention will now be illustrated with reference to the following drawings.

The invention will now be described in greater details by way of example only, with reference to the accompanying drawings.

Figure 1:
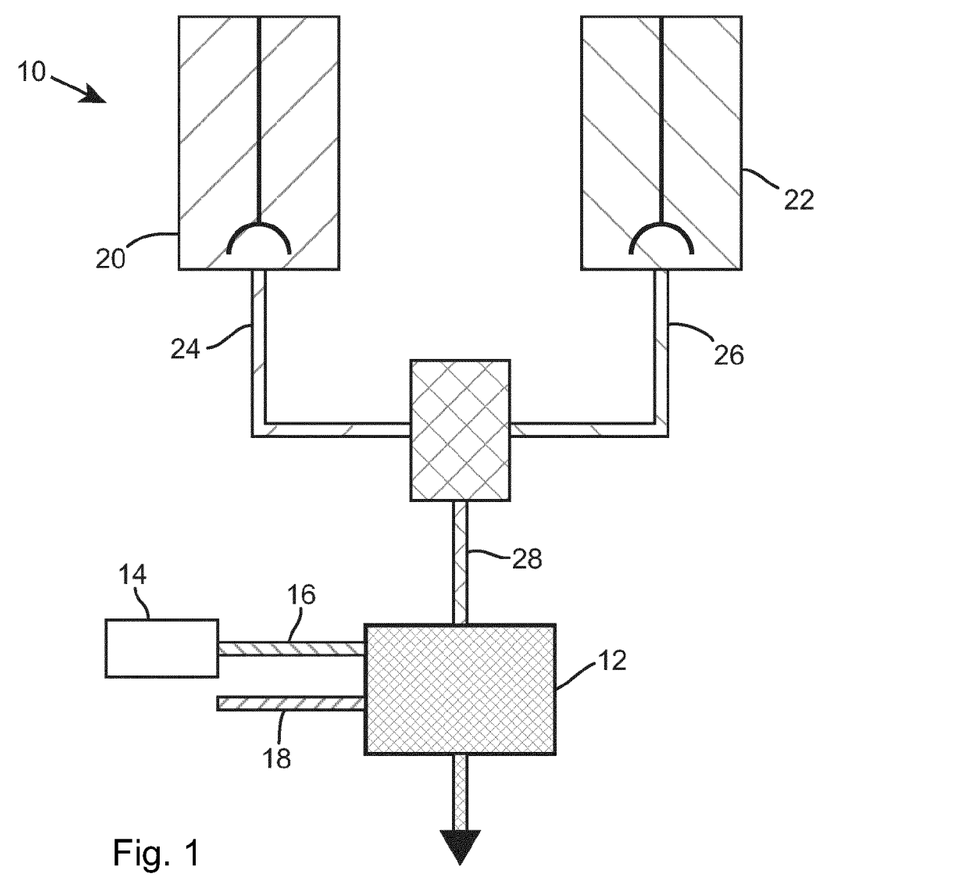
FIG. 1 is a schematic representation of an embodiment of the present invention.

Referring to FIG. 1 a gypsum product manufacturing process is shown generally at 10. Gypsum product manufacturing processes are used in the manufacture of plasterboard and include a mixer 12 into which dry gypsum powder is delivered from a source 14 via a conduit 16.

Water is delivered to the mixer 12 via a further conduit 18.

Two foam generators 20 and 22 are arranged so as to provide two separate foam inputs 24, 26 which are combined before being fed into the mixer via foam feed conduit 28. In the embodiment shown in FIG. 1 the foam generators 20 and 22 and their respective feeds conduits 24 and 26 are positioned parallel to one another.

In operation powdered gypsum or gypsum plaster is supplied continuously through the conduit 16 and water is provided through its conduit 18. The water and gypsum are mixed thoroughly together. Foam produced by the foam generators 20 and 22 are mixed together via their respective conduits 24 and 26 to provide one feed 28 of 'mixed' foam. This mixed foam feed 28 is then directed into the mixer 12.

Figure 2:
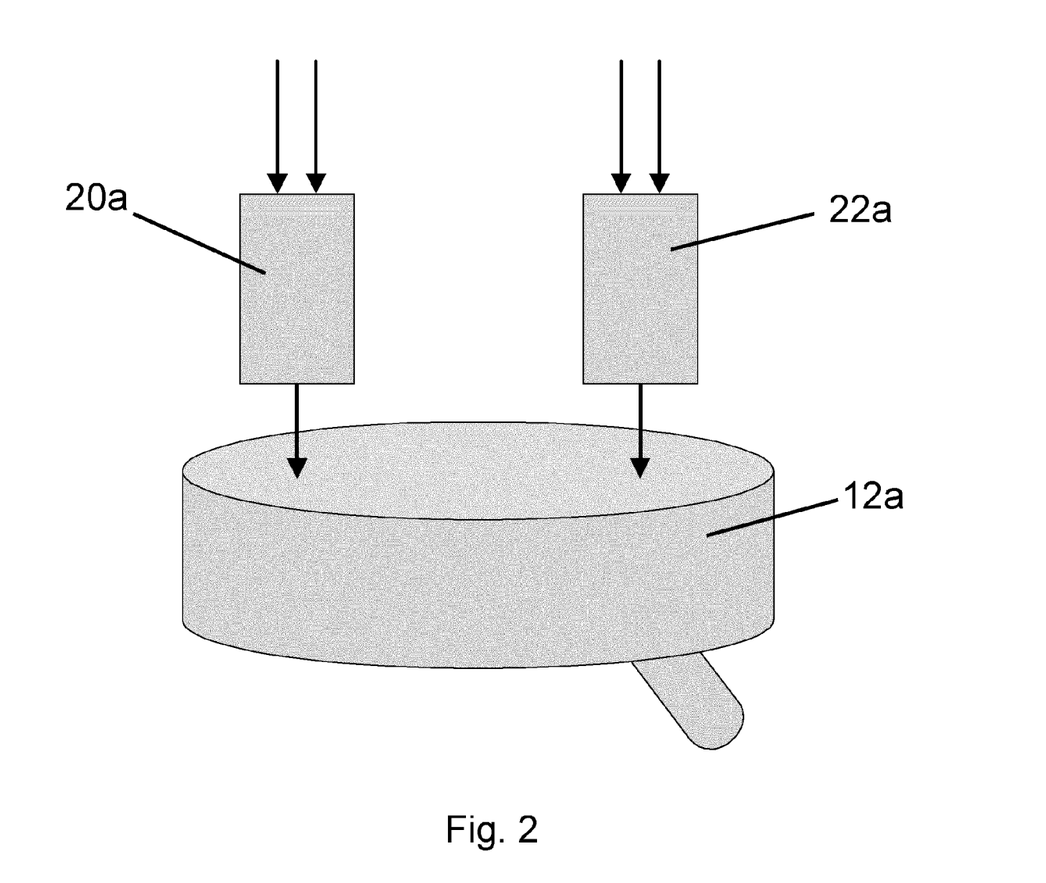
FIG. 2 is a schematic representation of a further embodiment of the present invention

Alternatively, the foam streams produced by the two foam generators may be injected separately into the slurry mixer, each foam stream being injected at a respective injection point. FIG. 2 shows such an arrangement, in which foam generators 20a and 22a produce foam streams that are injected separately into the mixer 12a, without previously being mixed together.

When, as is commonly the case, the additives and other ingredients are required within the gypsum product manufacturing process, these may be added at any stage through specially provided inlets.

Figure 3:
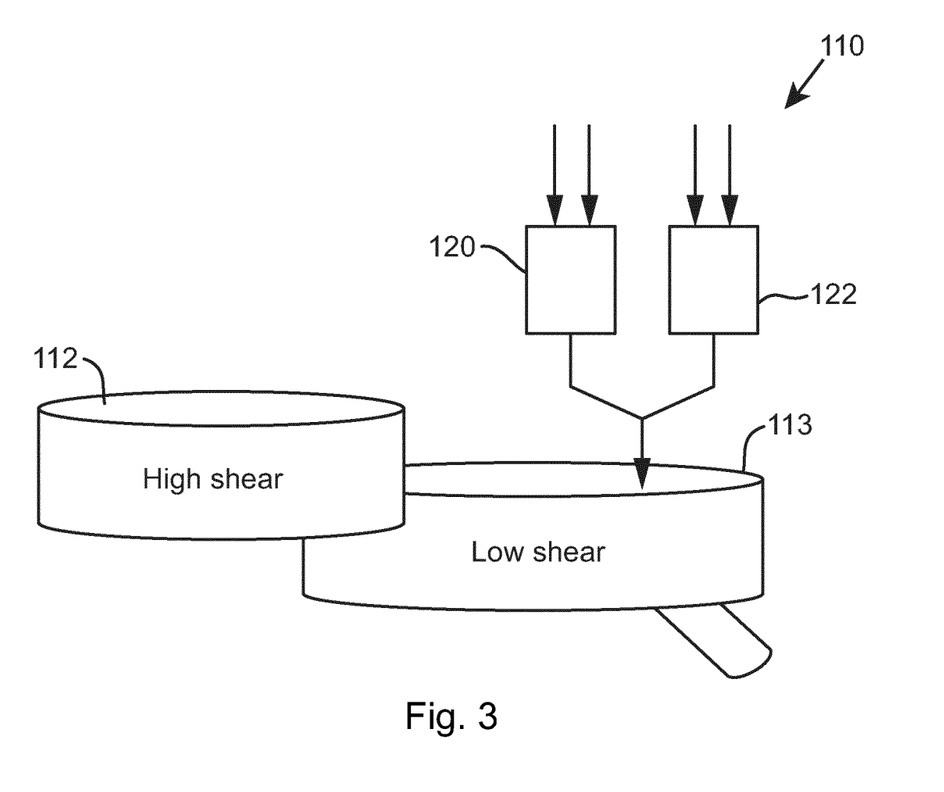
FIG. 3 is a schematic representation of a further embodiment of the present invention.

Referring to FIG. 3 a gypsum board manufacturing process is shown generally at 110. In this embodiment of the present invention two mixers 112 and 113 are provided. Both mixers 112 and 113 simultaneously produce foamed gypsum slurries. However the first mixer 112 may preferably be a relatively high shear compared to the second mixer 113. The gypsum mixture produced by mixer 112 is fed via a conduit (not shown) into the second mixer 113.

Parallel foam streams are generated in foam generators 120 and 122. The foam streams are mixed and injected into the second (low shear mixer) 113.

The high shear mixer 112 provides a highly reactive slurry, while the low shear mixer 113 allows foam to be incorporated into the mixer while avoiding damage to the foam structure.

Figure 4:
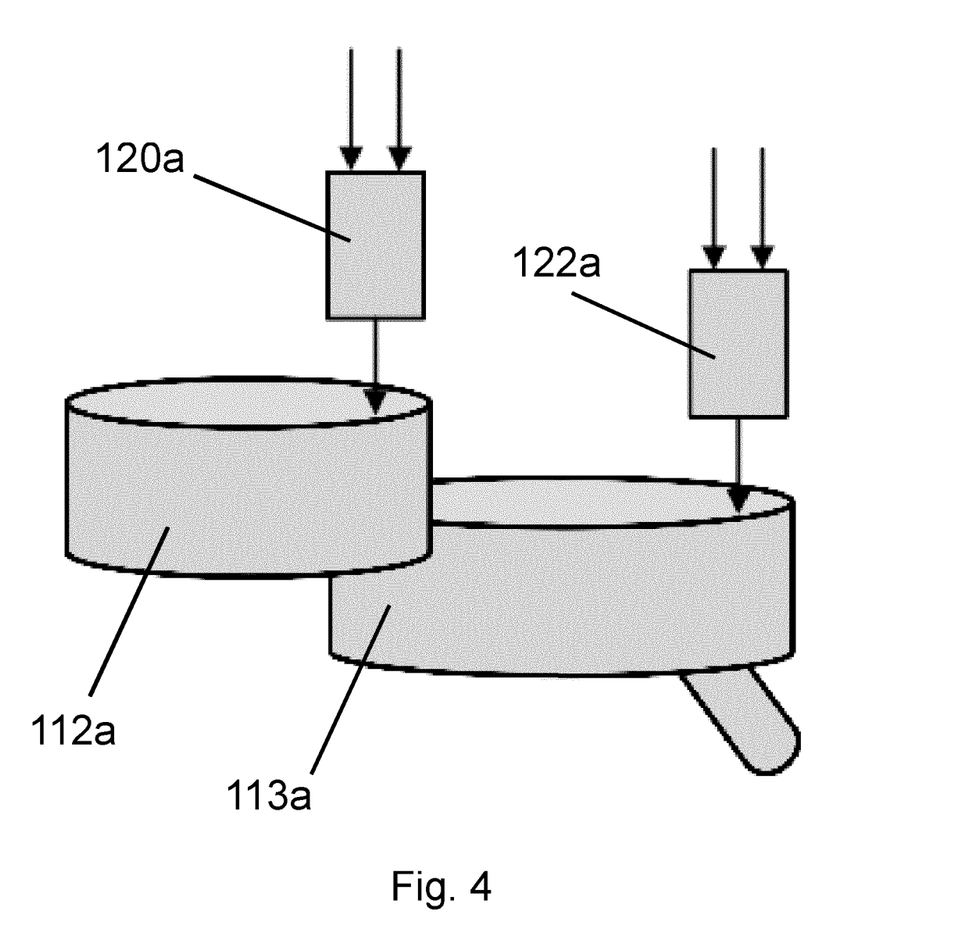
FIG. 4 is a schematic representation of a further embodiment of the present invention.
Figure 5:
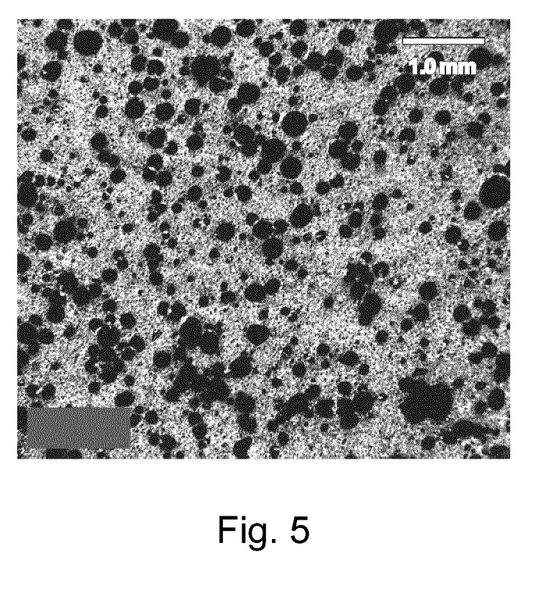
FIG. 5 is a scanning electron micrograph of a gypsum polished section of a specimen of Example 1

Alternatively, one foam generator may produce a foam stream that is injected into the upstream mixer, while the other foam generator may produce a foam stream that is injected into the downstream mixer. Such an arrangement is shown in FIG. 4, in which foam generator 120a produces a foam stream that is injected into high shear mixer 112a, while foam generator 122a produces a foam stream that is injected into low shear mixer 113a, which is downstream of high shear mixer 112a.

Typically, the foam stream that is injected into the high shear mixer 112a has a smaller bubble size than the foam stream that is injected into the low shear mixer 113a. Thus, damage to the less stable foam (that is, the foam stream having a larger bubble size) may be reduced.

Numerous other additives which are not discussed or illustrated herein but well known additives in the art may also be added to the mixers 12,12a,112,113,112a,113a. Such additives my include retarders, accelerators, fibrous materials and starch. Each would be delivered via a suitable conduit at a designated stage in the mixing process.

Example 1

Samples for measurement of nail pull resistance and compressive strength were prepared with the following composition:

TABLE 1

| Component | Weight (php, for 100 parts of stucco) |
| --- | --- |
| Stucco (calcium sulphate hemihydrate) | 100 |
| Starch | 0.5 |
| Retarder | 0.004 |
| Total Water (including foam water) | 75 |
| Foam | See Table 2 |

Foam Prefabrication:
  Foaming agent is diluted in water to form a foaming solution (i.e. at 0.1/ww for 100 parts of stucco). STEOL DES32 from Stepan®, (32% active) was used.
  The foaming solution flow and the air flow are split into two fractions each alimenting a respective foam generator (foam generator 1 and foam generator 2). Both foam generators are dynamic foam generators.
  The foams produced from foam generator 1 and foam generator 2 are combined to form a final foam. The foams are combined in the proportions 30%-70% volume fraction for the foam from foam generator 1 and foam generator 2 respectively.
  The properties of the foams produced from foam generator 1 and foam generator 2, as well as the final foam are set out in Table 2.

TABLE 2

| Foam Generator 1 | | | | | Foam Generator 2 | | | | | Final Foam | | |
|---|---|---|---|---|---|---|---|---|---|---|---|---|
| % | Air flow (l/min) | Surfactant sln. flow (l/min) | Foam density (g/l) | $\emptyset_{air}$ | % | Air flow (l/min) | Surfactant sln. flow (l/min) | Foam density (g/l) | $\emptyset_{air}$ | Tot. air (l/min) | Tot. Surfactant sln. flow (l/min) | Tot. Foam density (g/l) | Tot. $\emptyset_{air}$ |
| 30 | 0.5 | 0.15 | 231.7 | 0.77 | 70 | 1.5 | 0.05 | 33 | 0.97 | 2.00 | 0.20 | 92.0 | 0.91 |

Plaster Slurry Preparation:
  Weigh the stucco and the dry components (i.e. 1000 g).
  Dry blend the stucco and the dry components together.
  Weigh the required amount of water (i.e. 650 g). The water temperature needs to be approximately 40° C.
  The process water is placed in a Waring™ Commercial 4 L blender equipped with an electric speed controller.
  The dry powder is then poured into the blender during a period of 30 s.
  Wait a further 30 seconds for the stucco to wet out.
  At 60 s, start the mixing at 15000 rpm for 10 s.
Sample Preparation:
  The blender is stopped and the required amount of foam starts to be added to the initial slurry (i.e. 100 g).
  The mixing of the foam with the initial slurry could be done gently using a spatula or using the blender at the lower speed level (i.e. about 6700 rpm) during 10 s.
  The slurry is then poured into the following moulds:
    a) Mini board samples (i.e. 150 mm×150 mm×12.5 mm); An envelope of wallboard cardboard for the measurement of the Nail pull resistance.
    b) Cylinder samples (i.e. 0:23 mm×50 mm) for the measurement of the compressive strength.
  The sample is then kept to set the described moulds, dried into a ventilated oven at high initial and then low final temperatures until it dry.
  The sample is conditioned at 40° C. for 24 hours, weighed and subjected to a compression test and a nail pull test. The nail pull test was carried out according to ASTM C473 (method B: constant rate of cross head speed).

Comparative Example 1
  Samples for measurement of nail pull resistance and compressive strength were prepared using the same methods as for example 1, with the exception that foam prefabrication was carried out as detailed below.
Foam Prefabrication:
  Foaming agent is diluted in water to form a foaming solution (i.e. at 0.1/ww for 100 parts of stucco). STEOL DES32 from Stepan®, (32% active) was used.
  The foaming solution flow and the air flow are passed through foam generator 1 (a dynamic foam generator) using the parameters given in Table 3.

TABLE 3

| Foam Generator 1 | | | |
|---|---|---|---|
| Air flow (l/min) | Surfactant sln. flow (l/min) | Foam density (g/l) | $\emptyset_{air}$ |
| 2.0 | 0.60 | 231.7 | 0.77 |

Comparative Example 2
  Samples for measurement of nail pull resistance and compressive strength were prepared using the same methods as for example 1, with the exception that foam prefabrication was carried out as detailed below.
Foam Prefabrication:
  Foaming agent is diluted in water to form a foaming solution (i.e. at 0.1/ww for 100 parts of stucco). STEOL DES32 from Stepan®, (32% active) was used.
  The foaming solution flow and the air flow are passed through foam generator 2 (a dynamic foam generator) using the parameters given in Table 4.

TABLE 4

| Foam Generator 2 | | | |
|---|---|---|---|
| Air flow (l/min) | Surfactant sln. flow (l/min) | Foam density (g/l) | $\emptyset_{air}$ |
| 2.0 | 0.067 | 33 | 0.97 |

Comparative Example 3
  Samples for measurement of nail pull resistance and compressive strength were prepared using the same methods as for example 1, with the exception that foam prefabrication was carried out as detailed below.
Foam Prefabrication:
  Foaming agent is diluted in water to form a foaming solution (i.e. at 0.1/ww for 100 parts of stucco). STEOL DES32 from Stepan®, (32% active) was used.
  the foaming solution flow and the air flow are injected into a first foam generator (foam generator 1). The produced foam is then re-injected into a second foam generator (foam generator 2) in order to produce the reference foam. Thus, the foaming solution passes through foam generator 1 and foam generator 2 in series. Both foam generator 1 and foam generator 2 are dynamic foam generators.
  The parameters used in foam generation are given in Table 5

TABLE 5

| Foam Generator 1 | | | | | Foam Generator 2 | | | | |
|---|---|---|---|---|---|---|---|---|---|
| % | Air flow (l/min) | Surfactant sln. flow (l/min) | Foam density (g/l) | $\emptyset_{air}$ | % | Air flow (l/min) | Surfactant sln. flow (l/min) | Foam density (g/l) | $\emptyset_{air}$ |
| 100 | 2.0 | 0.20 | 92.0 | 0.91 | 0 | X | X | 92 | 0.91 |

Results: Mechanical Testing

The mechanical properties of example 1 and comparative examples 1-3 are set out in Table 6, for an equivalent dry core density of 650 kg/m$^3$.

TABLE 6

|  | Compressive test Normalised Peak stress (MPa) | Nail pull test Normalised Peak load (lbf) |
| --- | --- | --- |
| Example 1 | 153% | 118% |
| Comparative example 1 | 100% | 94% |
| Comparative example 2 | 116% | 114% |
| Comparative example 3 | 100% | 100% |

Results: Micrography

Figure 6:
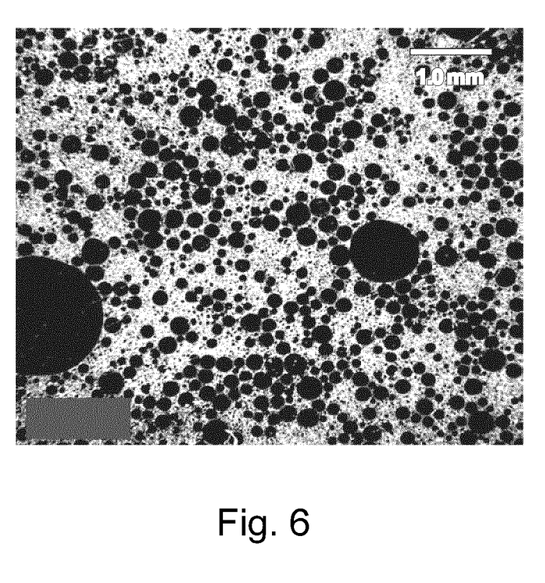
FIG. 6 is a scanning electron micrograph of a gypsum polished section of a specimen of Comparative Example 1
Figure 7:
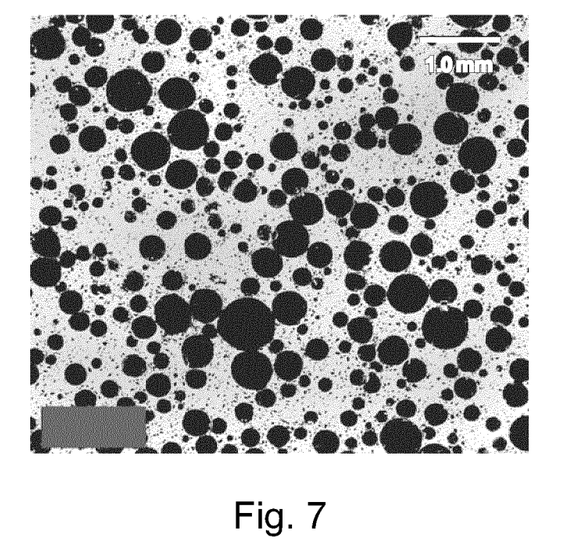
FIG. 7 is a scanning electron micrograph of a gypsum polished section of a specimen of Comparative Example 2
Figure 8:
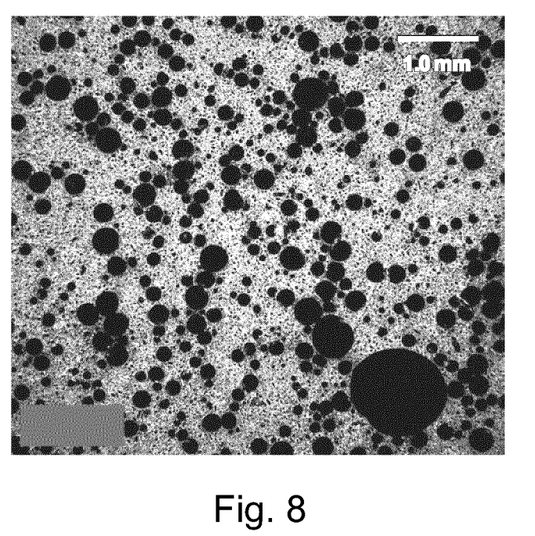
FIG. 8 is a scanning electron micrograph of a gypsum polished section of a specimen of Comparative Example 3

FIGS. 6 and 7 are scanning electron micrographs of a polished section of Comparative Examples 1 and 2 respectively. The comparison of FIG. 6 and FIG. 7 shows the significantly larger pore sizes that are formed when foam is produced using foam generator 2, rather than foam generator 1.

Comparative Example 4

Samples were prepared according to the method of comparative example 1 (i.e. using the foam prefabrication method detailed in comparative example 1 and the plaster slurry preparation and sample preparation methods of example 1). The rotational speed of the mixer was varied during the step of mixing the foam with the initial slurry.

Figure 9:
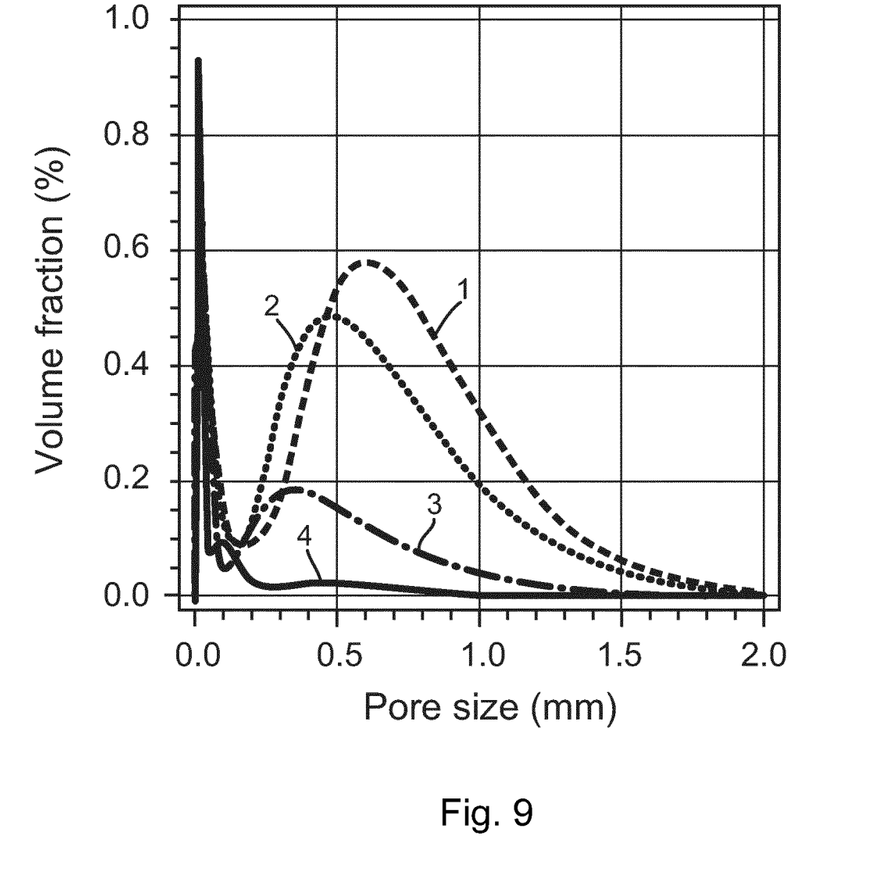
FIG. 9 is a graph showing the results of Comparative Example 4

FIG. 9 shows the pore size distribution of four gypsum samples prepared using this method, as a function of the rotational speed of the mixer.

Curve 1 shows the pore size distribution of a sample prepared using a rotational mixer speed of 6700 rpm (revolutions per minute).

Curve 2 shows the pore size distribution of a sample prepared using a rotational mixer speed of 8700 rpm (revolutions per minute).

Curve 3 shows the pore size distribution of a sample prepared using a rotational mixer speed of 10400 rpm (revolutions per minute).

Curve 4 shows the pore size distribution of a sample prepared using a rotational mixer speed of 12000 rpm (revolutions per minute).

The pore size distribution graph shown in Table 7 was obtained by $^1$H-NMR relaxometry on porous gypsum samples fully re-saturated with water. Technical details concerning this analytical technique and its feasibility in the characterisation of gypsum based porous structures are described in the following academic references [Jaffel, H. et al. *J. Phys. Chem. B,* 2006, 110 (14), 7385-7391; Song, K. M. et al., *J. Mat. Science,* 2009, 44(18), 5004-5012]. The presented results were obtained using an inverse Laplace Transform of a transverse NMR relaxation decays acquired using a standard CPMG pulse sequence.

From these results, it may be seen that a higher mixer speed results in a smaller pore size of the final gypsum product and lower Foam Efficiency Factor, as set out in Table 7.

TABLE 7

| Mixer speed (rpm) | Foam Efficiency Factor (%) |
| --- | --- |
| 12000 | 37 |
| 10400 | 48 |
| 8700 | 88 |
| 6700 | 98 |

The invention claimed is:

1. A method of producing a gypsum product wherein calcined gypsum is mixed with water; characterized in that at least two different foam feeds are introduced into the gypsum and water mix simultaneously, the first foam feed comprising a different bubble size distribution when compared to the second foam feed, wherein the first foam feed is generated in a first foam generator using a first foam generation process and the second foam feed is generated in a second foam generator using a second foam generation process, at least one physical parameter of the first foam generation process being controlled independently of the second foam generation process, and wherein a first foam-generating surfactant used in the first foam generation process has the same composition as a second foam-generating surfactant used in the second foam generation process.

2. The method according to claim 1, wherein the at least one physical parameter is the foam generation temperature.

3. The method according to claim 1, wherein the at least one physical parameter is the air inflow rate.

4. The method according to claim 1, wherein at least one of the foam feeds is generated in a dynamic foam generator, and the at least one physical parameter is the rotation speed of the dynamic foam generator.

5. The method according to claim 1, wherein at least one of the foam feeds is generated in a static foam generator, the static foam generator including a porous filler medium, the at least one physical parameter being the pore size of the porous filler medium.

6. The method according to claim 1, wherein the first foam-generating surfactant has a higher concentration by weight percentage than the second foam-generating surfactant.

7. The method according to claim 1, wherein the first foam feed comprises bubbles with a smaller mean size than the second foam feed.

* * * * *